United States Patent
Sheehan et al.

(10) Patent No.: US 7,810,827 B2
(45) Date of Patent: Oct. 12, 2010

(54) PILOT OPERATED VALVE WITH INVERSION CONTROL AND PRESSURE HOLD FUNCTIONS

(75) Inventors: Brian D. Sheehan, Mentor, OH (US); Randy S. Wise, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 423 days.

(21) Appl. No.: 11/859,594

(22) Filed: Sep. 21, 2007

(65) Prior Publication Data

US 2009/0079154 A1 Mar. 26, 2009

(51) Int. Cl.
*B60G 11/26* (2006.01)

(52) U.S. Cl. .............................. 280/124.16; 280/6.157; 280/124.161

(58) Field of Classification Search ............ 280/124.16, 280/124.161, 124.157, 6.157; 92/106, 175; 137/58, 82
See application file for complete search history.

(56) References Cited

U.S. PATENT DOCUMENTS 5,052,713 A 10/1991 Corey et al.

7,624,994 B2 * 12/2009 Stegmann ................ 280/5.514

OTHER PUBLICATIONS

Bendix Service Data Brochure, SD-03-1064, "Bendix R-12 & R-14 Relay Valves", Bendix Commercial Vehicle Systems, LLC, 2004, pp. 1-6.
Bendix Service Data Brochure, SD-03-2205, "Bendix SC-3 In-Line Single Check Valves", Bendix Commercial Vehicle Systems, LLC, Mar. 2007, pp. 1-2.
Bendix Service Data Brochure, SD-03-4650, "Bendix TR-2, TR-3 & TR-4 Inversion Valves", Bendix Commercial Vehicle Systems, LLC, 2004, pp. 1-4.

* cited by examiner

*Primary Examiner*—Eric Culbreth
(74) *Attorney, Agent, or Firm*—Fay Sharpe LLP (57) ABSTRACT

A valve is disclosed for use in a system and process for controlling vehicle loading on a multi-axle vehicle and improving maneuverability. The valve partially exhausts air from an axle air bag when the vehicle is maneuvering at slow speed, reduces the load on the axle, and thus reduces damaging forces that affect tire wear and suspension component wear. The valve is a normally open, pilot operated valve that delivers supply air pressure upon receiving a sustained air pressure input of a pilot signal. Using an inversion function, the valve then dumps the delivery pressure through a high capacity exhaust upon receiving the pressure input of a secondary control signal. The hold function of the valve traps a reduced amount of delivery air pressure by closing the exhaust valve, and the hold function is actuated at a predetermined delivery pressure to trap a volume of air in the associated air suspension system until the valve member is returned to a supply position.

23 Claims, 6 Drawing Sheets

PILOT OPERATED VALVE WITH INVERSION CONTROL AND PRESSURE HOLD FUNCTIONS

BACKGROUND OF THE INVENTION

This disclosure relates to a suspension system and valve for a multi-axle vehicle, and more particularly to providing a single valve that replaces three valves as used in a known suspension system. More particularly, the disclosure is directed to a normally open, pilot operated valve that delivers supply air pressure upon receiving a sustained air pressure input of a pilot signal and, using an inversion function, the valve dumps delivery pressure through a high capacity exhaust upon receiving the pressure input of a secondary control signal. A hold function of the valve traps a small amount of delivery air pressure by closing the exhaust valve.

Federal regulation, namely Title 49 of the Code of Federal Regulations, Section 393.207, states that "the air suspension exhaust controls must not have the capability to exhaust air from the suspension system of one axle of a two-axle air suspension trailer unless the controls are either located on the trailer, or the power unit and trailer combination are not capable of traveling at a speed greater than ten miles per hour while the air is exhausted from the suspension system." One proposed solution is outlined in U.S. Pat. No. 5,052,713, the disclosure of which is incorporated herein by reference. The '713 patent is directed to a vehicle suspension system such as used in multi-axle tractor-trailers and other multi-axle vehicles. When maneuvering a trailer in a confined area such as a loading dock, torque is exerted on the trailer frame. One solution to the torque issue is to remove the load from all but one axle. The '713 patent teaches that air should be exhausted from the air bags on all but one axle in order to improve maneuverability at low speeds or during tight turns. Moreover, and per the federal regulation, the load must be redistributed to the multiple axles once the tight turn maneuvering is complete. Otherwise, the potential exists that a single axle may be overloaded, since the load has not been shifted to multiple axles. The overloading could result in potential damage to the trailer frame or dynamic loading encountered by the vehicle.

Although the '713 patent provides one solution, there are some downsides to this methodology and system. First, there is risk of damage to the air bags when all air is exhausted therefrom. The air bags may be pinched. Thus, there is a need to hold pressure in the air bags while the vehicle is maneuvering at slow speeds.

A current solution is to use a number of conventional valves to dump air from air bags of a first or rearward trailer axle suspension system, and thereby take weight off that axle. This allows the trailer to pivot on the second or front trailer axle during the turn. Once the turn is complete, air is then returned to the rear axle suspension.

Using three (3) separate valves to perform this function is not cost effective. Multiple valves add overall system costs, add complexity to installation, and also raise attendant maintenance issues. Thus, a need exists for a single, multi-function valve for use primarily on multi-axle semi trailers equipped with air suspensions, and particularly use of such a valve in a system that exhausts air from a rearward axle air suspension system when the vehicle is maneuvering at slow speeds, reduces the load on the rear axle, and thus reduces damaging forces that effect tire wear and suspension component wear. The valve must be able to deliver supply air pressure upon receiving a sustained air pressure input of a pilot signal. Additionally, as part of an inversion function, the valve must dump the delivery pressure through a high capacity exhaust upon receiving the pressure input of a secondary control signal. Last, the valve must provide a hold function that traps a small amount of delivery air pressure.

SUMMARY OF THE INVENTION

A system for improving maneuverability of an associated multi-axle vehicle having an air suspension assembly including air bags and a reservoir of pressurized air, a leveling valve receiving pressurized air from the reservoir, and a single valve selectively delivering air to the air bags of the associated vehicle and for preventing the first axle air bags from being completely exhausted. A controller monitors a speed of the vehicle and selectively provides a control signal indicative of whether the vehicle speed is below a predetermined threshold.

A valve for use in an associated multi-axle vehicle where pressure to an air suspension system is altered includes a housing having a valve chamber and a valve member that is movable in the chamber for controlling air pressure to the associated air suspension system of the associated vehicle. The valve member has an exhaust position for interconnecting the air suspension to an exhaust, a supply position where air pressure is delivered to the associated air suspension system, and a hold position for preventing communication between the exhaust and associated air suspension system, while also preventing communication between the supply and the delivery to the associated air suspension. The hold position is actuated at a predetermined delivery pressure to trap a volume of air in the associated air suspension system until the valve member is returned to the supply position A valve used in a system for improving maneuverability of an associated multi-axle vehicle having an air suspension assembly and a leveling valve includes a housing having a supply port that communicates with the associated leveling valve, a reservoir port that receives pressure from an associated air supply reservoir, a control port for receiving an associated control pressure signal, an exhaust port for communicating with ambient, and a delivery port communicating with the associated air suspension assembly. A valve member is received in the housing and movable among an (i) exhaust position for interconnecting the delivery port with the exhaust port, (ii) a supply position connecting the supply port with the delivery port such that air pressure is delivered to the associated air suspension assembly, and (iii) a hold position for blocking communication between the exhaust port and the delivery port, while also preventing communication between the supply and the delivery to the associated air suspension.

A primary benefit is the use of a single valve solution to replace separate, plural valves.

Another benefit is the ability to deliver supply air pressure in high volumes upon receiving a sustained air pressure input of a pilot signal.

Still another benefit resides in using an inversion function so that the valve dumps delivery pressure through a high capacity exhaust upon receiving the pressure input of a secondary control signal.

Yet another benefit is the provision of a hold function for keeping a reduced amount of air pressure in the air suspension system.

The disclosure reduces overall system cost.

Installation complexity is also reduced with this single valve solution.

Maintenance is also minimized by reducing the number of components

Still other benefits and advantages of the disclosure will become apparent to those skilled in the art upon reading and understanding the following detailed description.

DETAILED DESCRIPTION OF THE PREFERRED EMBODIMENTS

Commonly owned, co-pending U.S. application Ser. No. 11/859,568 provides different patent solutions to improved maneuvering of a multi-axle semi trailer vehicle (not shown) equipped with axle air suspensions. The disclosure of the commonly owned application is incorporated herein by reference. More particularly, those various solutions partially exhaust air from air bags to reduce tire wear and improve vehicle maneuvering at slow speeds. Although air bag pressure is reduced, the air is not substantially exhausted from the bags, which advantageously results in improved fill rate of the air bags once the slow speed maneuvering is completed.

A vehicle operator actuates a switch, for example on the dashboard of the vehicle, and vehicle speed is monitored through a signal provided to an electronic control unit (ECU) of the vehicle. As will be appreciated this is the same information is input to the trailer antilock brake system (ABS or TABS) controller as typically found on vehicles of this type. In addition, a warning lamp may be provided to indicate whether or not the switch for activating the trailer suspension dump has been actuated. Modified software is incorporated into an existing ABS controller which then indicates if the vehicle speed is greater than, for example, ten (10) miles per hour, whereby air must be automatically restored to the first or rear axle air bags. Only when the vehicle speed reaches some predetermined threshold, e.g., less than eight (8) to ten (10) miles per hour, will the software permit air bag pressure to be reduced. Thus, wheel speed is already provided to the ABS controller and can interact with the modified software to achieve these functions.

Figure 1:
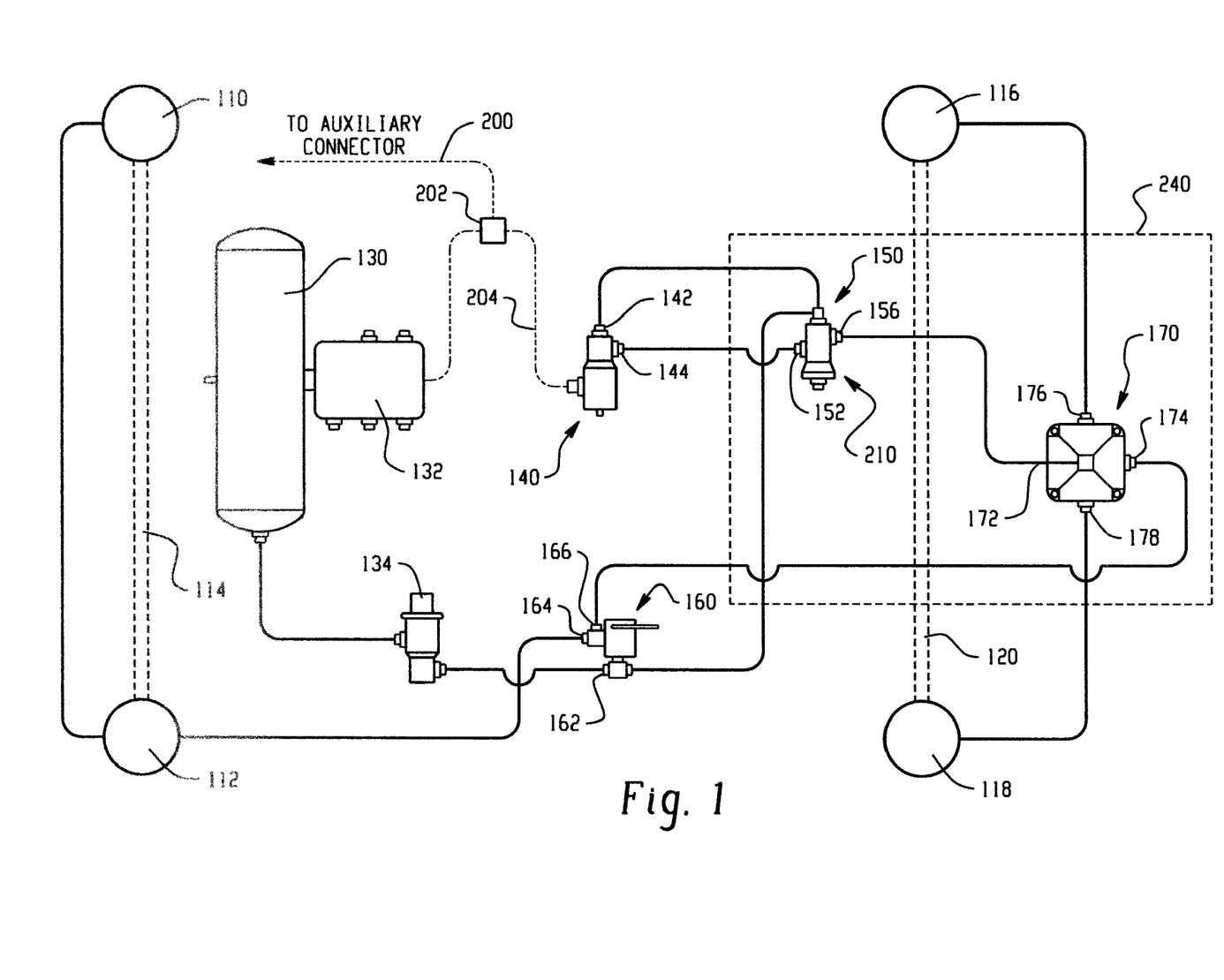
FIG. 1 is a schematic representation of a current proposed solution to control air suspensions in a multi-axle semi trailer equipped with an air suspension system.

Front air bags 110, 112 are associated with the front axle 114. Similarly, the suspension system includes air bags 116, 118 that are associated with the rear axle 120. Pressurized air is provided from reservoir 130 which is maintained at a desired pressure by a compressor (not shown), as is well known in the art. All of the details of a conventional trailer antilock brake system (TABS) are not shown in order to reduce complexity, simplify the drawings, and for purposes of brevity. However, TABS controller 132 is represented as being in communication with the air reservoir 130 to provide rapid pulsed or controlled brake application in an anti-lock braking event, again, as is well known in the industry. As will also be appreciated, suitable signals are provided from the wheels to the controller 132 so that vehicle speed can be monitored.

The air suspension system, and particularly, the individual air bags 110, 112, 116, 118 of the multiple axles are supplied with pressurized air from the reservoir 130. A pressure protection valve 134 is located downstream of the reservoir and protects system air pressure if a downstream failure in the suspension system occurs. The pressure protection valve 134 in such a situation would prevent system pressure loss for the remaining pneumatic systems of the vehicle.

The pressurized air is directly supplied to a valve assembly which includes a normally closed, three-way solenoid valve 140, and particularly a supply or inlet port 142 thereof. Delivery port 144 of the solenoid valve provides a control signal to an inversion valve 150, and particularly control port 152 thereof. Supply pressure from the protection valve 134 is also provided to a leveling valve 160, and specifically to the supply port 162 of the leveling valve. There are two delivery ports on the leveling valve. The first delivery port 164 supplies pressure to the air bags 110, 112 associated with the front axle. The second delivery port 166 communicates with a supply port of relay valve 170. During typical, non-dump operation, the solenoid is not energized in valve 140, and thus there is no signal provided to control port 152 of the inversion valve. Consequently, the inversion valve delivers air from port 156 to relay valve 170, namely the control port 172. Air from supply port 174 provides air through ports 176, 178 to the air bags 116, 118 of the rear axle of the suspension arrangement.

When the vehicle operator would like to convert to the dump operation, the switch is activated on the dashboard and provides a signal along line 200 to relay 202. Once the TABS controller 132 indicates that vehicle speed has been reduced to a velocity under ten (10) miles per hour, a signal is sent along line 204 to energize the solenoid. This, in turn, provides a control signal from port 144 of the solenoid valve to the control port of the inversion valve. The inversion valve then exhausts air that it would have otherwise delivered to the relay valve through a pressure protection valve 210. The pressure protection valve is designed to only partially exhaust the pressurized air to a certain predetermined level, for example ten (10) psi, and thereby cause the relay valve 170 to exhaust the rear suspension associated 116, 118 to the same level. In this manner, pressurized air is kept in the rear suspension air bags at a reduced level relative to the air bags of the front suspension.

As shown in FIG. 1, the dotted line box 240 represents one current valve solution that employs three separate valves, namely the inversion valve 150, pressure protection valve 210, and relay valve 170. A single valve 250 shown in different operative positions in FIGS. 2-5 is provided as a substitute to this multi-valve arrangement and is able to supply all of these same functions.

Figure 2:
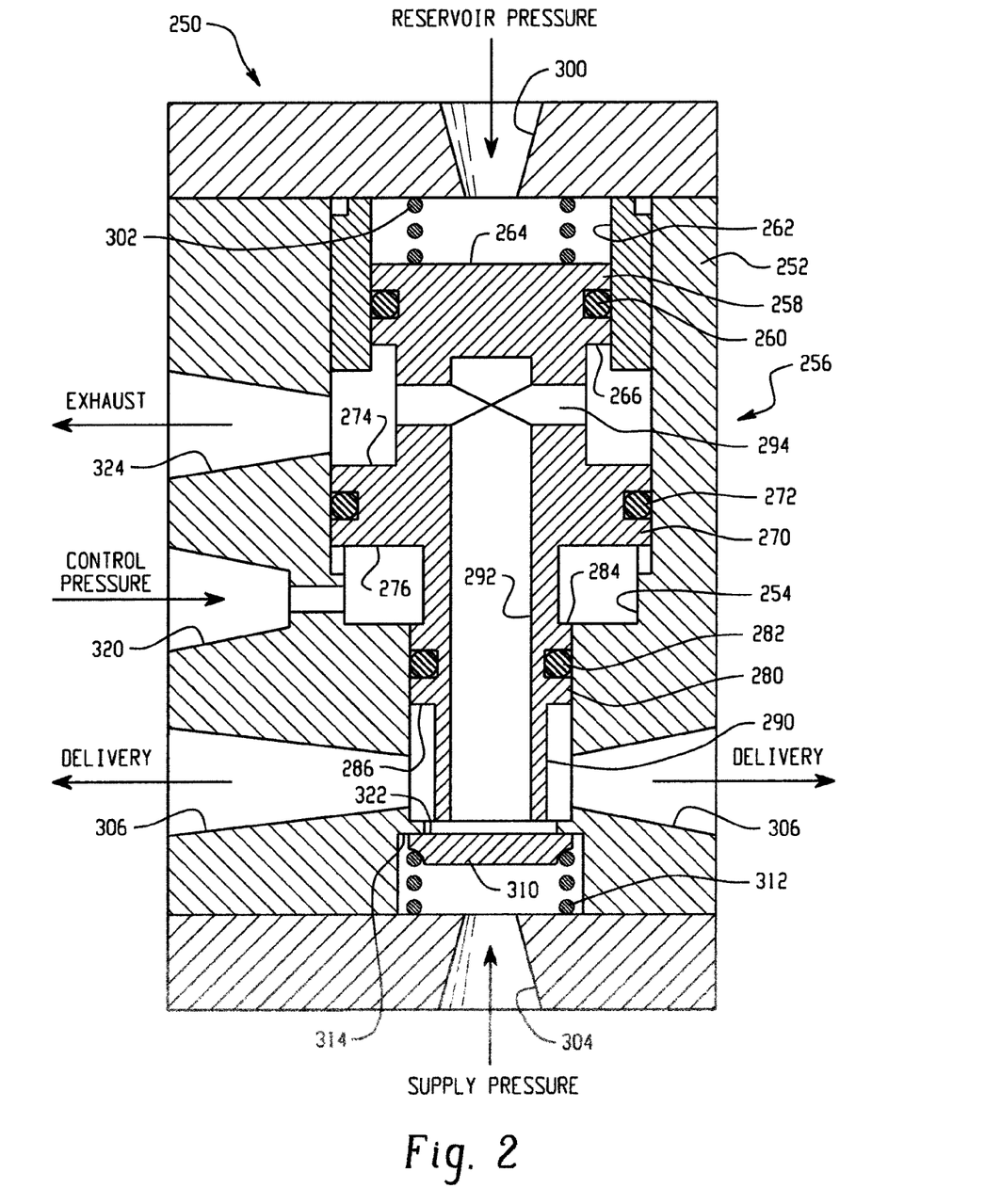
FIG. 2 is a cross-sectional view of a valve shown in a free state position (i.e., no pneumatic connections).

More particularly, valve 250 is intended to replace the function provided by the three valves enumerated above. The valve includes a housing 252 that has an internal chamber 254 divided into separate chamber portions by a movable valve or piston assembly 256. More particularly, the piston assembly includes a first piston portion 258 that has a perimeter seal member, namely seal ring 260, that slidably sealingly engages a reduced wall portion or insert 262 of the housing chamber. The first piston portion 258 includes a first or upper face 264 and a second or lower face 266. Axially spaced from the first piston portion is a second piston portion 270. The second piston portion also includes a perimeter seal member or seal ring 272 that sealingly engages along the chamber wall as the piston assembly moves in response to forces imposed by pressure differentials. The second piston portion includes a first or upper face 274 and a second or lower face 276. Last, a third piston portion 280 is axially spaced below the second piston portion. The third piston portion is also sealed along its perimeter via a third seal member or seal ring 282 received in a reduced dimension portion of the valve chamber. The third piston portion includes a first or upper face 284, and a second or lower face 286. The piston assembly further includes a piston stem 290 extending axially outward from the second face of the third piston portion. The stem 290 includes a passage 292 that extends from a terminal end of the stem and through the second and third piston portions. The passage communicates with cross passage 294 and thus with the enlarged diameter portion of the valve chamber intermediate the first and second piston portions.

Reservoir pressure from the pressure protection valve 134 is provided through port 300 of the housing. This pressure communicates with the valve chamber 254 and particularly acts on the first surface 264 of the first piston portion. The pressure on this surface area results in a force acting on the piston assembly, in addition to an urging or biasing force provided by spring 302. These combined forces urge the piston assembly away from port 300, i.e., downwardly as shown in FIG. 2. In the valve represented in FIG. 2, supply pressure from the leveling valve 160 would be adapted for connection with port 304.

Figure 3:
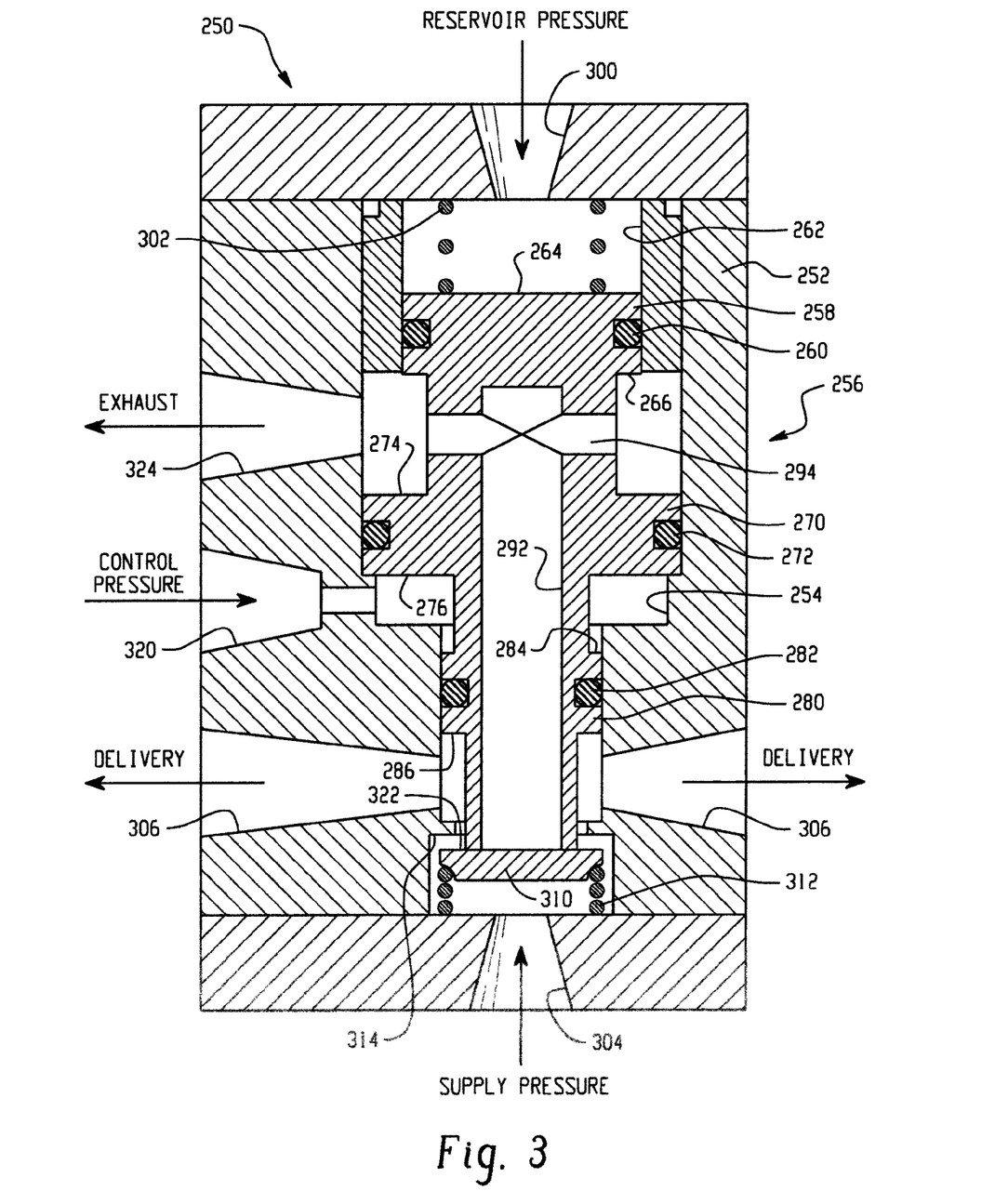
FIG. 3 shows the valve of FIG. 2 in a normal operation position.

As illustrated in FIG. 3, when the reservoir pressure builds on the first surface 264 of the first piston portion, the piston stem 290 is urged downwardly, and inlet/exhaust valve 310 is moved off the inlet seat and supply pressure at port 304 is then communicated to delivery ports 306. In this position, the air bags are inflated to the pressure level allowed by the leveling valve. This position is representative of the operation of the rear air bag suspension at higher speeds and when the vehicle operator has no desire to shift the load on the axles to improve maneuvering at low speeds.

Figure 4:
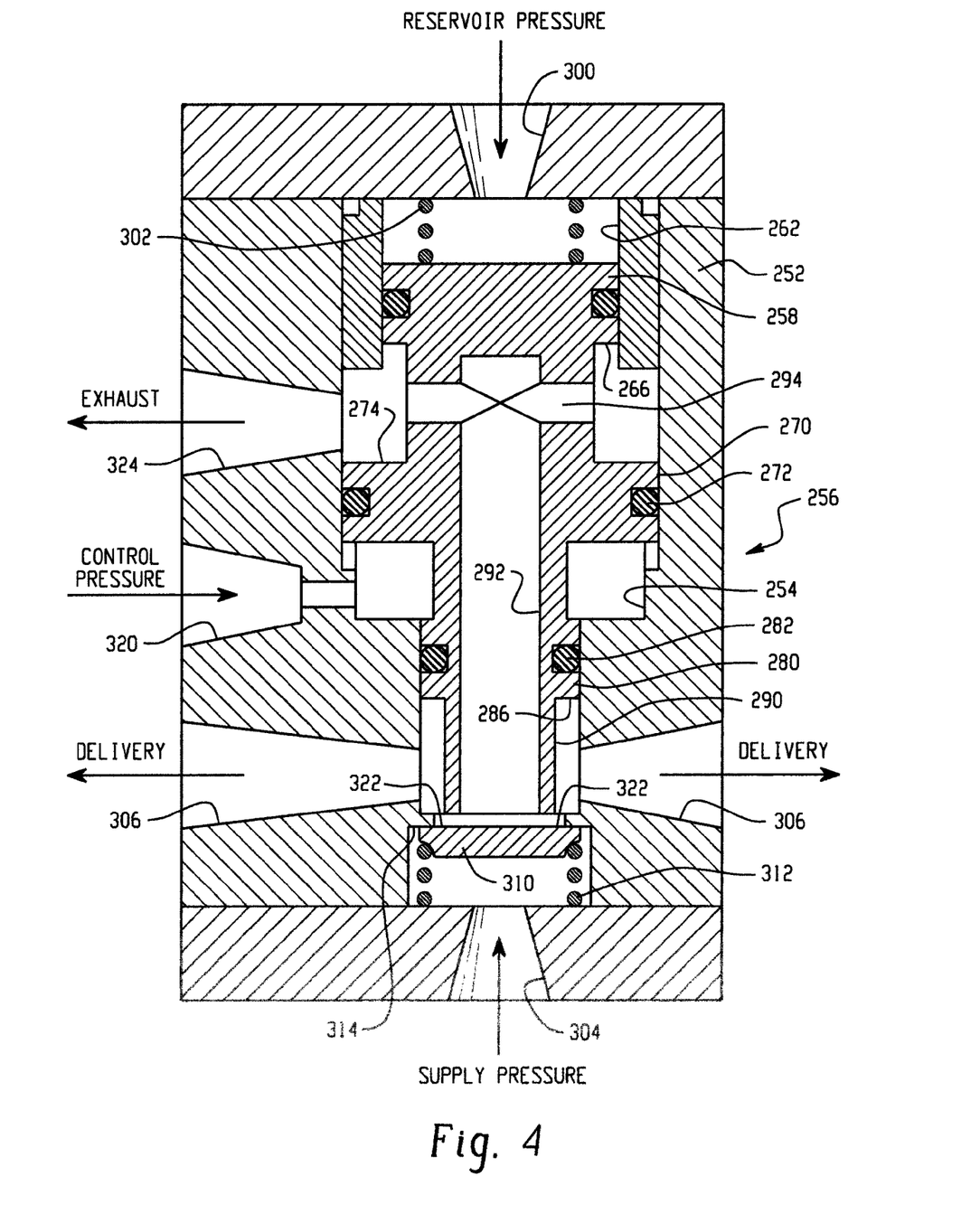
FIG. 4 shows the valve of FIG. 2 in an air dump mode.

FIG. 4 is representative of the valve operation when the vehicle operator has a need to shift the load on the axles at low speeds and once the conditions are met as described above in connection with FIG. 1 and the energizing of the solenoid valve 140. In FIG. 4, a pressure signal or control signal from the solenoid valve is communicated to port 320. This control signal pressure operates on the second face 276 of the second piston portion, and likewise the delivery pressure acts in the same direction on face 286 of the second piston portion. This results in a combined force reacting against the force of spring 302 and the reservoir pressure on the upper face of the first piston portion. The control pressure and delivery pressure moves the piston assembly upward which then allows the valve 310 to re-seat against inlet seat 314. Comparing the open position of the valve 310 in FIG. 3 with the position of the valve in FIG. 4, and also comparing the relative position of the end of the stem engaging the valve in FIG. 3 and being in spaced relation as shown in FIG. 4, illustrates the result of the control signal pressure acting on the face 276 of the second piston portion. The supply pressure from port 304 does not reach the delivery ports 306 that communicate with the air bags 116, 118 of the rear axle air suspension assembly in the position shown in FIG. 4. There is no communication between the supply port pressure and the delivery ports because valve 310 is normally urged by spring 312 into engagement with inlet seat 314, and the control pressure on the underside of the piston portion 270 lifts the stem from the valve 310, and opens communication between the delivery ports 306 and the exhaust port 324.

One skilled in the art will recognize that valve 310 is either open or closed, i.e., it is not intended to be regulated. It will be further appreciated that the control signal to port 320 occurs when the switch is activated. This results in the control signal being provided by the solenoid valve to port 320. In addition, this lifts the stem from the face 322 of the check valve and thereby establishes communication between the delivery ports 306 and the central passage 292 of the piston assembly. In this manner, a portion of the air is exhausted to port 324. Thus, the spring-biased valve 310 controls supply pressure to the delivery ports and thereby communicates the supply pressure with the rear air bags of the rear suspension system.

Figure 5:
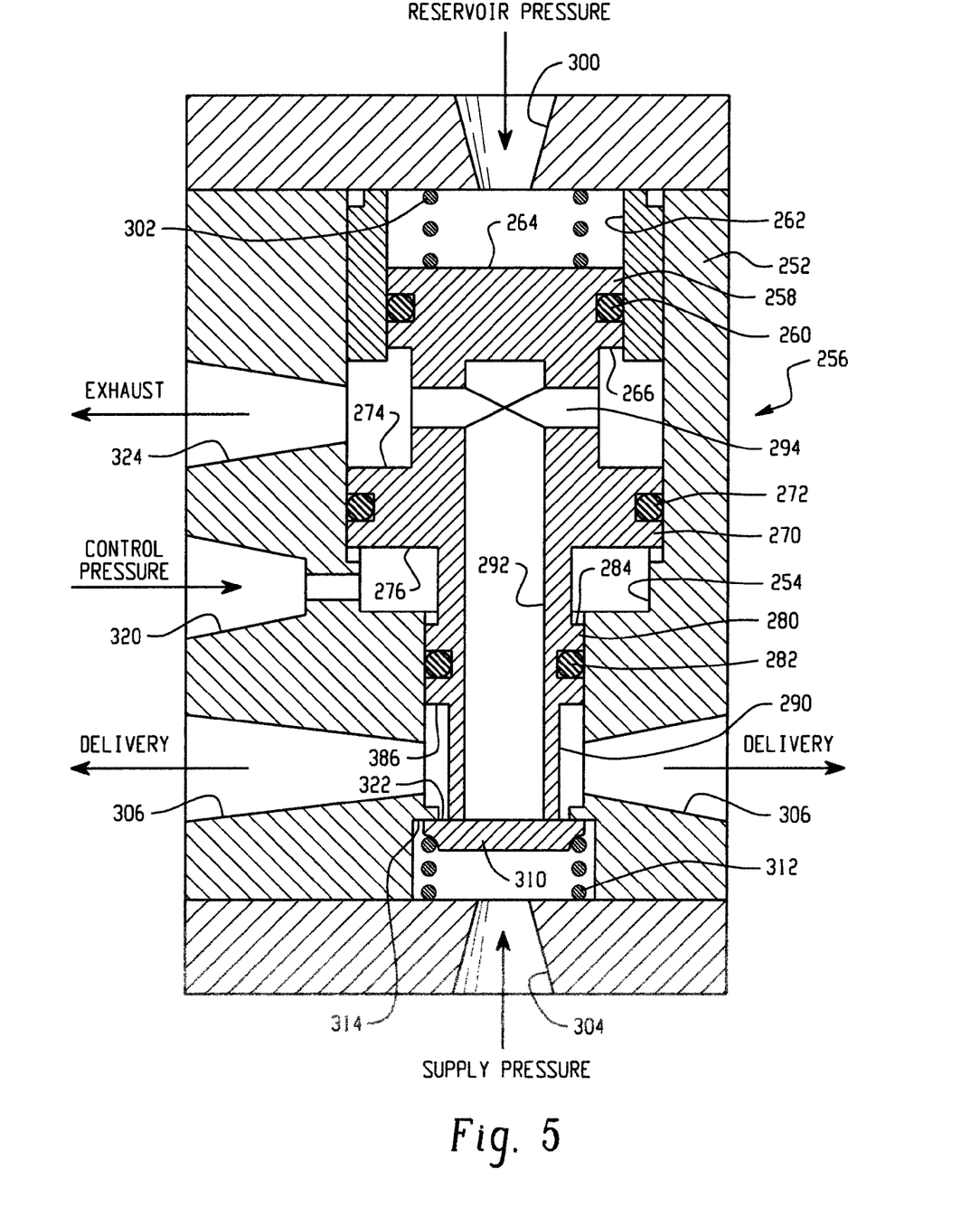
FIG. 5 shows the valve of FIG. 2 in a pressure hold function.

As previously noted, it is also desired that the single valve include a "hold pressure" state during certain conditions, particularly during the tight maneuvering application as described above. The pressure hold feature of the present valve is best illustrated in FIG. 5 where supply pressure is provided to port 304. As the delivery pressure acting on the third piston portion, particularly face 286, is reduced as a result of the communication between the delivery ports and the passage 292 through the piston stem that communicates with the exhaust port 324 (see FIG. 4), the stem of the piston eventually re-seats against the upper face 322 of the check valve. Thus, as evident in FIG. 5, the valve 310 is closed on both the inlet and exhaust seats (i.e., the exhaust seat is defined on the end of the stem). In this position, the valve will hold whatever delivery pressure is left in the valve, and this is at a reduced pressure, and thus keeps reduced pressure in the rear air bags until the control pressure at port 320 is terminated. The control pressure is terminated by the operator deactuating the switch or the ABS system sensing a vehicle speed over ten mph and deactivating the solenoid 140 and thus reservoir pressure acting on the first surface of the first piston portion along with the force of the spring 302 will advance the piston stem to lift the valve 310 from the inlet seat. This, of course, results in supply pressure at port 304 reaching the air bags of the rear suspension system via ports 306 and thereby re-inflates the air bags to the increased or desired level.

Figure 6:
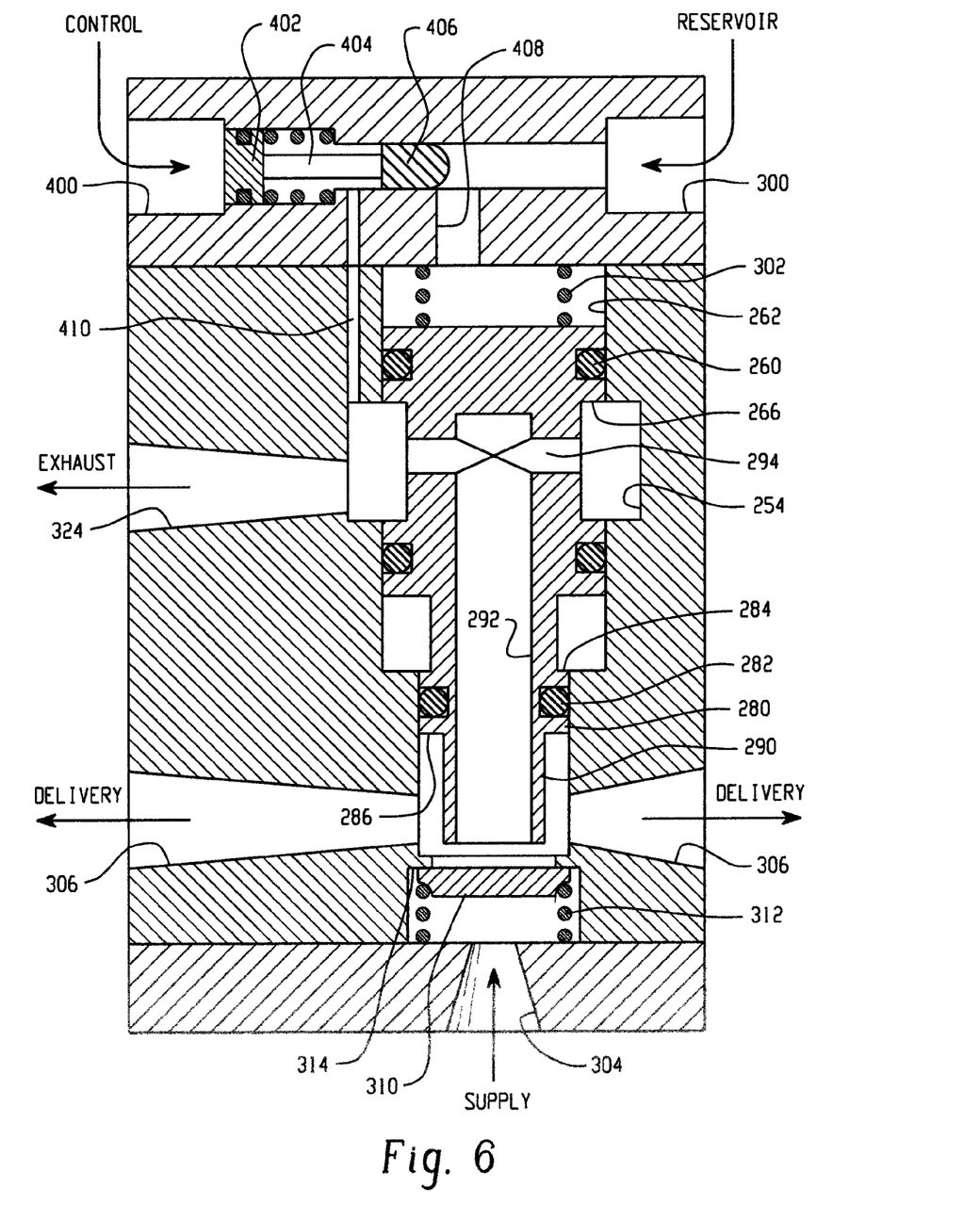
FIG. 6 is a view of an alternate valve structure.

FIG. 6 illustrates a second preferred embodiment of a single valve that provides these same functions. For purposes of brevity and consistency, where possible, like reference numerals refer to like elements and new reference numerals identify new components. In this arrangement, the control signal does not operate on the underside of the second piston portion. Instead, the control signal from the solenoid valve 140 is selectively provided to port 400. A separate mini-piston 402 has a rod 404 extending from one end. A seal member 406 is provided on the end of the rod. The seal is interposed between two passages, a first passage 408 that extends from reservoir port 300 into communication with the valve chamber and particularly with a first face 264 of the first piston portion, and a second passage 410 that communicates with the exhaust port 324. When control pressure is provided to port 400, the mini-piston moves rightwardly to first cover the passage 408 and then proceeds past the passage 408 and blocks communication between the reservoir port 300 and the first passage 408. In this latter position, pressure that otherwise acts on the face 264 of the first piston proceeds through the first passage 408 and then proceeds through the second passage 410 to communicate with the exhaust port 324. As a result, the piston assembly moves upwardly and the stem disengages from sealing relation with the upper face of the check valve 310. This established communication between the rear air bags and the exhaust port through the stem passage 292. After pressure in the valve is reduced as a result of the communication with the exhaust port, the stem re-seats with the upper face 322 of the check valve 310 and reduced pressure is kept in the air bags. Once the control pressure is eliminated at port 400, the mini-piston is urged by spring 412 to the position shown in FIG. 6 so that reservoir pressure again reaches the upper face of the first piston portion. Consequently, the piston moves downwardly and the stem engages the check valve upper surface 322 and supply pressure at port 304 communicates anew with the delivery ports 306 to fill the air bags of the rear suspension system.

On the other hand, when full reservoir pressure is supplied or applied, and the control signal is not provided to port 400, the piston assembly engages the check valve and moves away from the inlet seat. Since the piston stem engages the upper face of the check valve, supply pressure can then reach the delivery ports and allows the rear axle air bags to fill. The exhaust port, on the other hand, is closed since the piston engages the upper face of the check valve and precludes communication through passages 292, 294 with exhaust port 324.

The described embodiments provide a valve assembly that has two control signals. The first signal is associated with reservoir pressure being used as a pilot pressure. The reservoir pressure supplies pressure to the first face 264 resulting in a force acting on the piston assembly to establish communication between the supply and delivery ports, while preventing communication between the delivery port 306 and the exhaust port 324 since the stem passage 292 is closed as a result of stem engagement with the face 322 of the inlet/exhaust valve 310. In addition, the control signal along line 204 then results in energizing the solenoid so that the control signal from port 144 of the solenoid valve is provided to the control port 152 of the inversion valve 150. Further, the delivery pressure is then partially exhausted to a reduced level where a hold pressure is established, i.e., when the valve changes from the position shown in FIG. 4 to the position of FIG. 5 where the stem has moved into engagement with face 322 of the inlet/exhaust valve, and further communication between the delivery ports 306 and the exhaust port 324 is precluded.

The invention has been described with reference to the preferred embodiment. Modifications and alterations will occur to others upon reading and understanding this specification. It is intended to include all such modifications and alterations in so far as they come within the scope of the appended claims or the equivalents thereof.

Having thus described the invention, it is now claimed:

1. A valve for use in an associated multi-axle vehicle where pressure to an air suspension system is altered, the valve comprising:
    a housing having a valve chamber formed therein; and
    a valve member movable in the chamber for controlling air pressure to the associated air suspension system of the associated vehicle, the valve member having an exhaust position for interconnecting the air suspension to an exhaust, a supply position where air pressure is delivered to the associated air suspension system, and a hold position for preventing communication between the exhaust and the associated air suspension system that is actuated at a predetermined delivery pressure to trap a volume of air in the associated air suspension system until the valve member is returned to the supply position, the delivery pressure being used to provide a force which urges the valve member toward the exhaust position.

2. The valve of claim 1 wherein the valve housing includes a supply port selectively communicating with a delivery port in communication with the associated air suspension system.

3. The valve of claim 1 further comprising a passage selectively interconnecting the valve chamber with the exhaust port.

4. The valve of claim 3 wherein the passage includes a first portion interconnecting a reservoir port with the valve chamber.

5. The valve of claim 4 wherein the passage first portion is selectively blocked in response to a control pressure signal.

6. The valve of claim 5 wherein the passage includes a second portion that communicates with the passage first portion in response to the control pressure signal.

7. The valve of claim 2 wherein the supply port is connected to the delivery port upon a sustained pilot signal, and the supply port is blocked from the delivery port upon a secondary control input signal.

8. The valve of claim 1 wherein the delivery pressure reduces to a predetermined hold pressure during an exhaust mode, at which the communication of further delivery pressure to the exhaust is blocked.

9. A valve for use in an associated multi-axle vehicle where pressure to an air suspension system is altered, the valve comprising:
    a housing having a valve chamber formed therein; and
    a valve member movable in the chamber for controlling air pressure to the associated air suspension system of the associated vehicle, the valve member including a passage therethrough that selectively interconnects a delivery port in communication with the associated air suspension system with an exhaust port, the valve member having an exhaust position for interconnecting the air suspension to the exhaust port, a supply position where air pressure is delivered via the delivery port to the associated air suspension system, and a hold position for preventing communication between the exhaust port and the associated air suspension system that is actuated at a predetermined delivery pressure to trap a volume of air in the associated air suspension system until the valve member is returned to the supply position.

10. The valve of claim 9 wherein the valve member includes first, second and third piston portions.

11. The valve of claim 10 wherein reservoir pressure from the associated vehicle acts on the first piston portion for urging the valve member toward the supply position.

12. The valve of claim 10 wherein a control pressure signal provided to the valve acts on the second piston portion while the delivery pressure acts on the third piston portion for urging the valve member toward the exhaust position.

13. The valve of claim 12 wherein the valve member moves to a hold position after delivery pressure in the valve chamber is communicated with an exhaust port.

14. The valve of claim 9 wherein the supply port normally communicates with the delivery port in the absence of a control pressure signal provided to the valve.

15. The valve of claim 14 wherein combined control and delivery pressure signals move the valve member to the exhaust position.

16. The valve of claim 15 wherein the reservoir pressure overcomes the control and delivery pressure signals to move the valve member to the hold position after the exhaust position.

17. The valve of claim 9 wherein the supply port is connected to a delivery port upon a sustained pilot signal, and the supply port is blocked from a delivery port upon a secondary control input signal.

18. A system for improving maneuverability of an associated multi-axle vehicle having an air suspension assembly including first and second air bags comprising:
    a reservoir for pressurized air;
    a leveling valve receiving pressurized air from the reservoir;
    a single valve selectively delivering air to the air bags of the associated vehicle and for preventing the first air bag from being completely exhausted; and a controller for monitoring a speed of the vehicle and selectively providing a control signal indicative of whether the vehicle speed is below a predetermined threshold.

19. The system of claim 18 wherein the single valve includes a housing having a valve chamber formed therein and a valve member movable in the chamber for controlling air pressure to the associated air suspension system of the associated vehicle, the valve member has (i) an exhaust position for interconnecting the air suspension to an exhaust, (ii) a supply position where air pressure is delivered to the associated air suspension system, and (iii) a hold position for preventing communication between the exhaust and associated air suspension system that is actuated at a predetermined delivery pressure to trap a volume of air in the associated air suspension system until the valve member is returned to the supply position.

20. A valve used in a system for improving maneuverability of an associated multi-axle vehicle having an air suspension assembly and a leveling valve comprising:

a housing having a supply port that communicates with the associated leveling valve, a reservoir port that receives pressure from an associated air supply reservoir, a control port for receiving an associated control pressure signal, an exhaust port for communicating with ambient, and a delivery port communicating with the associated air suspension assembly; and a valve member received in the housing and movable among an exhaust position for interconnecting the delivery port with the exhaust port, (ii) a supply position connecting the supply port with the delivery port such that air pressure is delivered to the associated air suspension assembly, and (iii) a hold position for blocking communication between the exhaust port and the delivery port that is actuated at a predetermined delivery pressure to trap a volume of air in the associated air suspension system until the valve member is returned to the supply position.

21. The valve of claim 20 wherein the valve member includes a piston received in the housing to control flow between the supply port and delivery port.

22. The valve of claim 21 wherein the piston further controls flow between the exhaust port and the delivery port.

23. The valve of claim 20 further comprising a movable seal member that selectively blocks flow from the reservoir port to the valve member.

* * * * *